(12) United States Patent
Boys et al.

(10) Patent No.: US 10,305,393 B2
(45) Date of Patent: May 28, 2019

(54) RESONANT POWER SUPPLY WITH SELF TUNING

(71) Applicant: Auckland UniServices Limited, Auckland (NZ)

(72) Inventors: John Talbot Boys, Takapuna (NZ); Grant Anthony Covic, Mt. Albert (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 15/021,440

(22) PCT Filed: Sep. 10, 2014

(86) PCT No.: PCT/NZ2014/000196
§ 371 (c)(1),
(2) Date: Mar. 11, 2016

(87) PCT Pub. No.: WO2015/038010
PCT Pub. Date: Mar. 19, 2015

(65) Prior Publication Data
US 2016/0226400 A1    Aug. 4, 2016

(30) Foreign Application Priority Data
Sep. 12, 2013 (NZ) ........................ 615464

(51) Int. Cl.
*H02M 7/537* (2006.01)
*H02M 1/34* (2007.01)
(Continued)

(52) U.S. Cl.
CPC ............ *H02M 7/537* (2013.01); *H02M 1/34* (2013.01); *H02M 1/36* (2013.01); *H02M 1/42* (2013.01);
(Continued)

(58) Field of Classification Search
CPC .......... H02M 7/537; H02M 1/42; H02M 1/44; H02M 1/36; H02M 1/34; H02M 2007/4815
(Continued)

(56) References Cited

U.S. PATENT DOCUMENTS

| 4,277,667 A * | 7/1981 | Kiuchi | H05B 6/062 219/626 |
| 5,293,308 A * | 3/1994 | Boys | H02J 5/005 324/392 |

(Continued)

FOREIGN PATENT DOCUMENTS

CN    1813396    8/2006
WO    WO-2004105226    12/2004
(Continued)

OTHER PUBLICATIONS

Received search report from EIC 2800 STIC searcher Samir Patel dated Mar. 8, 2017.*

(Continued)

*Primary Examiner* — Timothy J. Dole
*Assistant Examiner* — Htet Z Kyaw
(74) *Attorney, Agent, or Firm* — Schwegman Lundberg & Woessner, P.A.

(57) ABSTRACT

This invention relates to current-fed resonant inverters for electrical power applications to change direct current (DC) into alternating current (AC). One application of the invention is to power supplies for inductive power transfer (IPT) systems. There is provided a resonant inverter including an input for supply of current from a DC power source, a resonant circuit including two coupled inductive elements and a tuning capacitance, the inductive elements being arranged to split current from the power source; a first switching means comprising two switching devices operable (Continued)

in substantially opposite phase to alternately switch current from the power source into the inductive elements; and a second switching means to selectively switch one or more control capacitances into or out of the resonant circuit dependent on a power factor of the resonant circuit.

14 Claims, 5 Drawing Sheets

(51) Int. Cl.
*H02M 1/36* (2007.01)
*H02M 1/42* (2007.01)
*H02M 1/44* (2007.01)
*H02M 7/48* (2007.01)
(52) U.S. Cl.
CPC ...... *H02M 1/44* (2013.01); *H02M 2007/4815* (2013.01)
(58) Field of Classification Search
USPC .................................. 363/131, 21.02, 21.03
See application file for complete search history.

(56) References Cited

U.S. PATENT DOCUMENTS

| | | | | |
|---|---|---|---|---|
| 5,350,413 A * | 9/1994 | Miller | ............... | A61N 1/3787 336/115 |
| 5,450,305 A | 9/1995 | Boys et al. | | |
| 5,559,688 A * | 9/1996 | Pringle | ............... | H02M 1/4241 363/84 |
| 5,892,300 A * | 4/1999 | Rydval | ............... | G06K 19/0723 307/104 |
| 5,898,579 A * | 4/1999 | Boys | ............... | B60L 5/005 191/10 |
| 5,953,642 A * | 9/1999 | Feldtkeller | ......... | G06K 19/0723 334/55 |
| 6,317,338 B1 * | 11/2001 | Boys | ............... | H02J 5/005 307/104 |
| 7,825,715 B1 * | 11/2010 | Greenberg | ............... | H03J 1/00 327/337 |
| 8,050,068 B2 * | 11/2011 | Hussmann | .......... | H02M 3/3374 363/134 |
| 8,406,017 B2 * | 3/2013 | Hu | ............... | H02M 3/3384 363/133 |
| 8,971,059 B2 * | 3/2015 | Peng | ............... | H02M 3/3376 363/21.03 |
| 2001/0012208 A1 * | 8/2001 | Boys | ............... | H02J 5/005 363/23 |
| 2003/0210106 A1 | 11/2003 | Cheng et al. | | |
| 2005/0035729 A1 * | 2/2005 | Lev | ............... | H05B 37/0263 315/291 |
| 2008/0211478 A1 | 9/2008 | Hussman et al. | | |
| 2008/0247210 A1 * | 10/2008 | Hu | ............... | H02M 3/3384 363/131 |
| 2009/0115340 A1 * | 5/2009 | Chen | ............... | H05B 41/2827 315/225 |
| 2011/0299313 A1 * | 12/2011 | Hussmann | .......... | H02M 3/3374 363/133 |
| 2015/0303824 A1 * | 10/2015 | Celani | ............... | H02M 7/217 307/104 |
| 2017/0358954 A1 * | 12/2017 | Ren | ............... | H02J 50/12 |

FOREIGN PATENT DOCUMENTS

WO    WO-2010/090539 A1    8/2010
WO    WO-2015/038010    3/2015

OTHER PUBLICATIONS

Received STIC search report from EIC 2800 searcher John DiGeronimo dated Jun. 14, 2018.*
"International Application No. PCT/NZ2014/000196, International Search Report and Written Opinion dated Dec. 1, 2014", (dated Dec. 1, 2014), 8 pgs.
"Chinese Application No. 201480059590.3, Notification of First Office Action dated Dec. 5, 2017", (dated Dec. 5, 2017), 13 pgs.

* cited by examiner

RESONANT POWER SUPPLY WITH SELF TUNING

PRIORITY CLAIM TO RELATED APPLICATIONS

This application is a U.S. national stage application filed under 35 U.S.C. § 371 from International Application Serial No. PCT/NZ2014/000196, which was filed 10 Sep. 2014, and published as WO2015/038010 on 19 Mar. 2015, and which claims priority to New Zealand Application No. 615464, filed 12 Sep. 2013, which applications and publication are incorporated by reference as if reproduced herein and made a part hereof in their entirety, and the benefit of priority of each of which is claimed herein.

FIELD OF THE INVENTION

This invention relates to current-fed resonant inverters for electrical power applications to change direct current (DC) into alternating current (AC). One application of the invention is with power supplies for inductive power transfer (IPT) systems.

BACKGROUND

Inverters have numerous applications in electrical power supplies including the production of alternating current power supplies, for example, when used as an inverter to convert a DC voltage into an AC voltage supply (e.g. an uninterruptible power supply). They may also be used in internal stages of DC to DC converters, induction heating, microwave generation, surface detection, medical experimentation, high frequency radio systems, IPT systems, etc.

Figure 1:
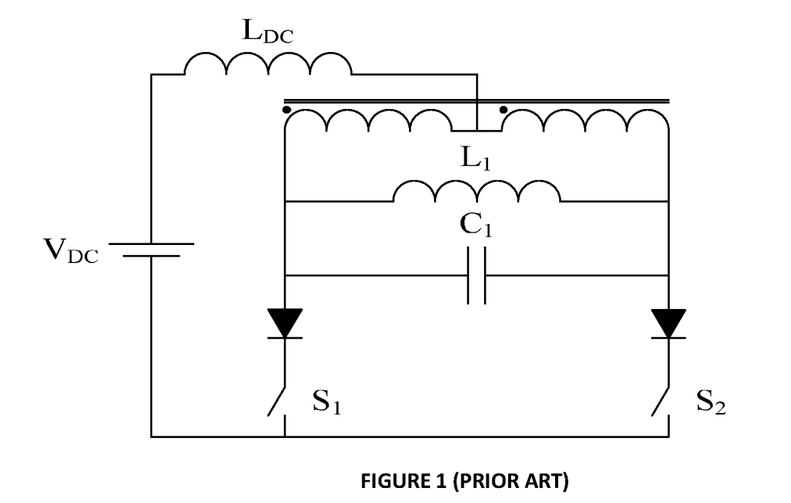
FIG. 1: is a schematic circuit diagram of a known push pull current fed resonant inverter.

A circuit schematic for a known push-pull current fed resonant inverter is shown in FIG. 1. The operation of such inverters is discussed in U.S. Pat. No. 5,450,305 the contents which are incorporated herein by reference. These resonant inverters have gained much popularity due to their low switching losses and low electromagnetic interference (EMI).

In IPT Systems the IPT power supply is ideally a fixed frequency power supply producing a fixed frequency sinusoidal output voltage. Such a power supply is shown in FIG. 1. The circuit of FIG. 1 has a DC inductor $L_{DC}$, a split phase transformer $L_{PS}$, and a parallel resonant tank circuit $C_1$ $L_1$. Switches $S_1$ and $S_2$ operate in anti-phase to produce a resonant voltage across the parallel tuned tank circuit. Diodes in series with the switches are added so that there is no possibility of the switches turning on at the same time and discharging $C_1$.

The inductor $L_{DC}$ provides a constant DC current source under steady state operating conditions. This inductor is usually designed to be large to overcome saturation problems. The phase splitting transformer with the two closely coupled windings $L_{SP}$ is used to divide the DC current into two branches, and the switches $S_1$ and $S_2$ are controlled to be "on" and "off" alternately, to change the direction of the current that is injected into the resonant tank circuit which comprises the coil $L_1$ and its tuning capacitor $C_1$. The resistor R represents the load supplied by the inverter.

An external controller (not shown) is also required in order to control the switches $S_1$ and $S_2$. The controller detects the resonant voltage (for example sensing the voltage across tuning capacitor $C_1$) and drives the switches at zero voltage crossings (Zero Voltage Switching). These switching techniques help to reduce the switching losses and EMI. To do so, an extra voltage transformer or winding is usually needed to detect the zero voltage crossings across the capacitor $C_1$. The detected information is used by the controller to drive the switches $S_1$ and $S_2$ and special gate drive circuits are usually required. The start-up of this form of inverter is relatively difficult, requiring a complex controller.

When operating at high frequencies a conventional power supply (not shown) has problems since as the frequency gets higher it becomes increasingly difficult to operate the supply as the required dV/dt and dI/dt transients are so high that operating the power supply is problematic. For example at a frequency of 140 kHz a complete cycle is only 7 microseconds so that if the switches switch on a 480V bus in 1% of a half cycle then the dV/dt on the switches is 480/(3.5 microseconds×1%)=13.7 kV/microsecond which is a very fast transient that makes the operation of high-side switches challenging. The circuit of FIG. 1 avoids this problem with soft switching and low dI/dt and dV/dt. However a difficulty with this circuit (FIG. 1) is maintaining an operating frequency in response to changes in the reactive load on the inverter and in particular maintaining a required power factor since the circuit can easily bifurcate.

BRIEF SUMMARY OF THE INVENTION

It is an object of the present invention to provide an inverter or a power supply or a method of operating an inverter or power supply which at least obviates one or more of the foregoing disadvantages or which will at least provide the public with a useful choice.

According to a first aspect there is provided a resonant inverter including an input for supply of current from a DC power source, a resonant circuit including two coupled inductive elements and a tuning capacitance, the inductive elements being arranged to split current from the power source; a first switching means comprising two switching devices operable in substantially opposite phase to alternately switch current from the power source into the inductive elements; and a second switching means to selectively switch one or more control capacitances into or out of the resonant circuit dependent on a power factor of the resonant circuit.

The first switching means such as $S_1$ and $S_2$ above switch on alternate half-cycles at the resonant frequency. The second switching means switch capacitors across the switching devices of the first switching means to change the tuning frequency of the inverter.

Such an arrangement may be used to reduce high peak voltages in the resonant circuit that may otherwise occur due to lack of tuning or low power factor. The presence of such high peak voltages, especially at high frequency where the rate of change in voltage would then be very high, can damage the switching devices. Tuning the inverter also optimises the power transferred for example in an IPT (inductive power transfer) secondary such as an electric vehicle. Selective switching of the control capacitors enables dynamic correction of the power factor which may vary due to external factors such as secondary load changes and/or coupling changes, for example due to a changing distance between the inductive elements and a secondary coil on an electric car.

In an embodiment, the second switching means comprises a switching device and a control capacitance connected in parallel with each of the switching devices of the first switching means. The second switching means may be arranged to switch the control capacitance into or out of the resonant circuit at zero current crossings of the tuning capacitance where changing the frequency of the inverter allows the power factor to be adjusted.

In an embodiment the resonant inverter further comprises a power factor detection circuit arranged to determine the power factor by determining the phase difference between the current of the resonant circuit and the switching signal for driving the switching devices.

In an embodiment the power factor detection circuit comprises a current transformer coupled to the resonant circuit and an integrating capacitor, a squarer coupled across the integrating capacitor, and a comparator for comparing the output of the squarer with the switching signal.

In an embodiment, individual or groups of a plurality of control capacitances are arranged to be selectively switched into or out of the resonant circuit in selected cycles of the resonant circuit to control the operation of the inverter. A series of control capacitances of different sizes may be combined by appropriate second switching means in order to get the circuit capacitance required to correct the determined power factor during the dynamic operation of the inverter In an embodiment, the resonant inverter further comprises a third switching means comprising two switching devices each connected to a control resistor and operable in substantially opposite phase to alternately switch current from the power source into the inductive elements, the first switching means being switched into or out of the resonant circuit in order to start or stop the resonant circuit. This arrangement provides a means to start and stop the resonant inverter the third switching means is operable all the time and the first switching means switches on when full power is required to bypass the control resistors.

In an embodiment, the resonant inverter may comprise a buck control circuit coupled between an input current source and the inductive elements, the buck control circuit having a diode and buck control switch having a duty cycle which is controlled in order to adjust the voltage across the tuning capacitor. This arrangement may be used to start and stop the resonant current, and may also be used to reduce the peak voltage when the resonant circuit is not tuned. This development offers better control options and additionally can be implemented with only three switches making this a cheap option.

There is also provided a method of operating a resonant inverter having an input for supply of current from a DC power source, a resonant circuit including two coupled inductive elements and a tuning capacitance, the inductive elements being arranged to split current from the power source, first switching means comprising two switching devices and second switching means; the method comprising: switching the two switching devices in substantially opposite phase to alternately switch current from the power source into the inductive elements; and switching the second switching means to selectively switch one or more control capacitances into or out of the resonant circuit dependent on a power factor of the resonant circuit.

The embodiments can provide a fixed frequency sinusoidal resonant inverter comprising using a digitally switchable power capacitor whereby the tuning frequency can be closely controlled to be near to the operating frequency at all times and the circuit operates at high efficiency with low distortion waveforms such that the switching voltage and the output current have a high power factor under steady state and dynamic conditions.

According to a second aspect there is provided a resonant inverter including an input for supply of current from a DC power source, a resonant circuit including two coupled inductive elements and a tuning capacitance, the inductive elements being arranged to split current from the power source; a first switching means comprising two switching devices operable in substantially opposite phase to alternately switch current from the power source into the inductive elements; and a buck control circuit coupled between the input and the inductive elements, the buck control circuit having a diode and buck control switch having a duty cycle which is controlled in order to reduce the voltage across the tuning capacitor in response to an over voltage condition.

The over voltage condition may be a pre-determined voltage threshold which can be measured directly or inferred from other parameters such as power factor.

This arrangement can also be used to reduce high peak voltages in the resonant circuit due to lack of tuning or low power factor. It can be implemented simply with a total of three switching devices comprising the first switching means of two transistors and the Buck switching means comprising one transistor, and is very low cost. Thus the duty cycle of the Buck switching means is controlled in order to reduce the DC supply voltage to the inverter in response to the switching of the first switching devices being out of phase with the resonant circuit resonating current. Alternatively or additionally, the duty cycle may be controlled in order to stop or start the resonant circuit.

There is also provided a method of operating a resonant inverter having an input for supply of current from a DC power source, a resonant circuit including two coupled inductive elements and a tuning capacitance, the inductive elements being arranged to split current from the power source, first switching means comprising two switching devices and a buck control circuit coupled between the input and the inductive elements, the buck control circuit having a diode and buck control switch second switching means; the method comprising: controlling a duty cycle of the buck control switch in order to control the voltage across the tuning capacitor in response to an over voltage condition or when starting and stopping.

In an embodiment the method comprises determining a voltage or power factor of the resonant circuit and controlling the duty cycle depending on the determined voltage or power factor.

The embodiments can provide a fixed frequency resonant inverter that operates at high efficiency with constant frequency but without tuning and errors are accommodated within the circuit but without high distortion or significant losses and the circuit can be shut down when required without damage.

According to a third aspect there is provided a resonant inverter including an input for supply of current from a DC power source, a resonant circuit including two coupled inductive elements and a tuning capacitance, the inductive elements being arranged to split current from the power source; a first switching means comprising two switching devices operable in substantially opposite phase to alternately switch current from the power source into the inductive elements; and a third switching means arranged to selectively switch a control resistance into or out of the resonant circuit in order to start or stop the resonant circuit.

Switching the control resistor into or out of the resonant circuit reduces or increases the resonant voltage to allow a controlled change between normal resonant operation and OFF, without large transient voltages being incurred that could damage the switching devices.

This arrangement can be used with or without the second switching means of the aspects described above.

In an embodiment the third switching means comprises two switching devices each connected to a control resistor and operable in substantially opposite phase to alternately switch current from the power source into the inductive elements. The third switching means may be selectively switched out of the resonant circuit when not starting or stopping the resonant circuit. In an embodiment the two transistors of the third switching means continue to be switched selectively out of phase to drive the resonant circuit when starting or stopping.

According to a fourth aspect there is provided a resonant inverter including an input for supply of current from a DC power source, a resonant circuit including two coupled inductive elements and a tuning capacitance, the inductive elements being arranged to split current from the power source; a first switching means comprising two switching devices operable in substantially opposite phase to alternately switch current from the power source into the inductive elements; a second switching means to selectively switch a control capacitance into or out of the resonant circuit to thereby change the resonant frequency of the resonant circuit; the switching devices arranged to change a switching frequency dependent on the selective switching of the second switching means.

This arrangement allows for selecting different operating frequencies of the resonant inverter. Switching control capacitances into and out of the resonant circuit changes the resonant frequency, and by controlling the switching frequency of the switching devices to match, the operating frequency of the resonant inverter can be selected for a particular application. Also operation at a slightly different frequency alters the phase relationship over time so that the power factor can be controlled. The other aspects noted above may then be used to control starting/stopping and tuning or power factor.

In an embodiment the second switching means comprises a switching device and a control capacitance connected in parallel with each of the switching devices of the first switching means.

In an embodiment the second switch means is arranged to switch the control capacitance into the resonant circuit at zero current crossings of the tuning capacitance.

In an embodiment the inverter further comprises a zero-voltage detection circuit having a current transformer coupled to the resonant circuit and an integrating capacitor, and a squarer coupled across the integrating capacitor.

In an embodiment individual or groups of control capacitances of a plurality of control capacitances are arranged to be selectively switched into or out of the resonant circuit in selected cycles of the resonant circuit to control the operation of the inverter.

In another aspect the invention consists in a resonant inverter including an input for supply of current from a DC power source, a resonant circuit including two coupled inductive elements and a tuning capacitance, the inductive elements being arranged to split current from the power source, a first switching means to controllably switch current from the power source into the resonant circuit, and a second switching means to selectively switch a control capacitance into or out of the resonant circuit to thereby change the natural resonant frequency of the resonant circuit.

In an embodiment the second switching means switches the control capacitance into the resonant circuit on voltage zero crossings of the tuning capacitance.

In an embodiment the second switch means switch the control capacitance into the resonant circuit at zero current crossings of the tuning capacitance.

The first switching means may comprise two switching devices operable in substantially opposite phase to alternately switch current from the power source into the inductive elements.

The second switching means may comprise a switching device connected in parallel with each of the switching devices of the first switching means, and a control capacitance being connected therebetween.

In an embodiment a plurality of second switch means and associated control capacitances are provided.

In an embodiment individual or groups of, control capacitances of a plurality of control capacitances can be selectively switched into or out of the resonant circuit in selected cycles of the resonant circuit to control the operation of the inverter over time. Thus the control capacitances can in some embodiments be connected or disconnected intermittently, or dithered to control the operation or characteristics of the resonant circuit over a plurality of cycles of operation of the resonant circuit.

In an embodiment power factor measurement means are provided which measure the power factor by comparing the current in the tuning capacitance with the switching control waveform(s) for the first switching means.

In an embodiment control means are provided which use the measured power factor to control the second switching means to change the power factor toward a desired power factor.

In another aspect the invention consists in a resonant inverter including an input for supply of current from a DC power source, a resonant circuit including two coupled inductive elements and a tuning capacitance, the inductive elements being arranged to split current from the power source, a first switching means to controllably switch current from the power source into the resonant circuit, and a second switching means to selectively switch a control resistance into or out of the resonant circuit to thereby change the Q factor of the resonant circuit.

In an embodiment the control resistance is chosen to provide near critical damping to the resonant circuit.

The first switching means may comprise two switching devices operable in substantially opposite phase to alternately switch current from the power source into the inductive elements.

The second switching means may comprise a switching device connected in parallel with each of the switching devices of the first switching means, and a control resistance being connected therebetween.

In another aspect the invention consists in an IPT power supply including an inverter according to any one of the preceding statements.

In another aspect the invention consists in a method of operating a resonant inverter, the method comprising selectively switching a control capacitance into or out of the resonant circuit of the inverter to control the frequency or phase or power factor of the inverter.

In an embodiment the method includes switching the control capacitance into the resonant circuit on voltage zero crossings.

In an embodiment the method includes switching the control capacitance into the resonant circuit at current zero crossings.

It should be noted that various changes and modifications to the presently preferred embodiments described herein will be apparent to those skilled in the art. Such changes and modifications may be made without departing from the spirit and scope of the present invention as set forth in the accompanying claims and without diminishing its attendant advantages. It is, therefore, intended that such changes and modifications be included within the present invention.

Throughout this document the word "comprise" and variations such as "comprises" and "comprising" is intended to be interpreted in an inclusive sense.

DETAILED DESCRIPTION

Inverters are basic building blocks for many modern power inverters. The new inverters described in this document can be used in various applications where high frequency voltage or current generation is required. These applications include but not limited to inductively coupled contactless power transfer, induction heating, DC-DC converters, uninterruptible power supplies for example.

Figure 2:
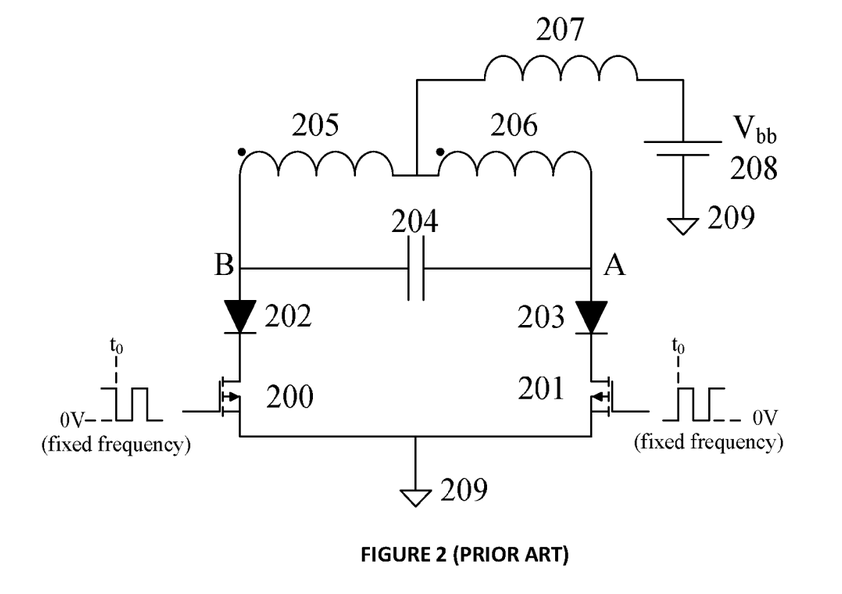
FIG. 2: is a circuit diagram of another known inverter.

The invention will now be described, beginning with an explanation of a known inverter which is shown in FIG. 2. This circuit is essentially the same as that in FIG. 1 but now there is no phase splitting transformer and two coupled inductors 205 and 206 are used instead. There is also no independent resonant inductor—the same inductors 205 and 206 perform this task as well. In both these circuits FIG. 1 and FIG. 2 switching the transistors in response to the natural oscillations of the circuit can cause bi-furcation on critical loads and then the power available to the IPT system is greatly reduced. The ideal operation of the circuit is quite simple. Transistors 200 and 201 are switched on and off in a complementary (push-pull) fashion. When 100 is ON the voltage at point B is low (ideally ground—209) and point A follows a half-sinewave voltage at the resonant frequency determined by the inductances 105 and 206 in series resonating with capacitor 204. When the voltage at A returns to ground switch 201 is turned ON, switch 200 is turned OFF and point B executes a half cycle. And so the process continues. If the system is perfectly tuned then 200 and 201 can be driven by a clock signal to keep the resonance going with the two switching devices 200 and 201 operating in substantially opposite phase to alternatively switch current from the power source 208 into the inductive elements. In practice perfect tuning is not practical so diodes 202 and 203 are added so that if the switches operate out of synchronism with the resonance, high circulating currents cannot flow through the switches and destroy them. In the practical operation of the circuit points A and B are only pulled to ground if diodes 202 and 203 are ON when switches 200 and 201 are ON respectively.

If the circuit is operating under no-load conditions this may not be the case and then the operation may be slightly compromised. Thus ideally the circuit should be operated on-load and with a fixed frequency.

In some applications there are significant advantages with the use of this circuit. Double D pick-up pads as described in international patent publication WO2010090539 have two coupled coils which can be used here (i.e. 205 and 206) as part of the power supply—and as part of the pick-up—saving the cost and space of separate inductor. The circuit has no transformer isolation but for an in-pad power supply it is not needed, and the circuit can self-tune. So when it is used in an in-pad situation as the air-gap or the alignment varies the pick-up can keep retuning the pad at about 1000 times per second or more. In this way any VAR load on the pick-up or power supply is significantly minimised.

A Power Supply with Two Operating Frequencies

Figure 3:
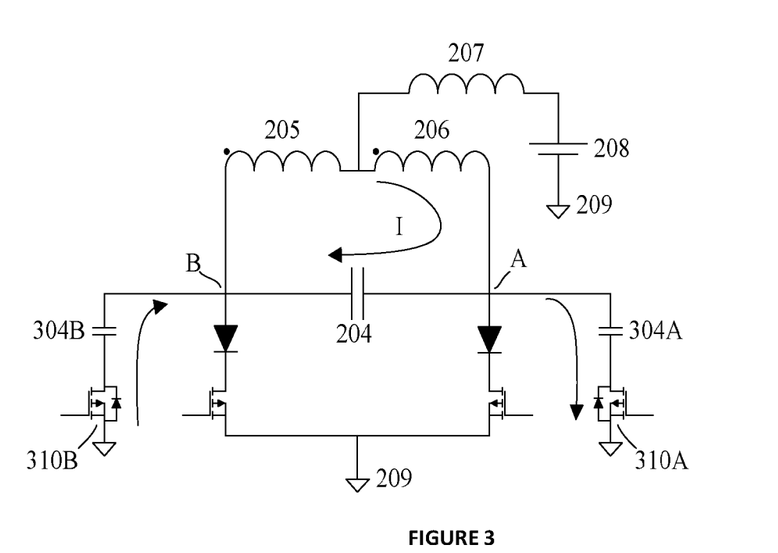
FIG. 3: is a diagram of one embodiment an inverter according to the present invention.

A new circuit is shown in FIG. 3 which can operate at 2 different frequencies.

Referring to FIG. 3, two extra capacitors 304A and 304B are added using switches 310A and 310B. Both of these switches have internal body diodes that can conduct in the reverse direction. When point A goes high in a semi-sinewave way with switch 310A on while point B is low then capacitor 304A is charged and discharged on that ½ cycle so that in essence capacitor 304A is in parallel with capacitor 204. Similarly on the next ½ cycle with switch 304B ON, when point B goes high capacitor 304 B is charged and discharged and capacitor 304B is in parallel with capacitor 204. Thus while switches 310A and 310B are ON capacitor 204 has a capacitor in parallel with it switched at each ½ cycle and the circuit will be resonant at a different frequency than it was before. Thus operation of the secondary switches 310A and 310B switch in or out control capacitances 304A and 304B thereby changing the resonant frequency of the inverter. At the same time the clock frequency driving the switches 200, 201, 310A, 310B is adjusted to match the new resonant frequency in order to restore tuning the clock frequency will need to be reduced. The tuning and switching or clock frequency can be switched very rapidly—whenever capacitor 204 is at zero volts switches 310A and 310B can be changed. The switches can be operated together as only one of them has voltage at any particular time, or they can be operated independently whenever the capacitor 204 is at zero voltage. The main switches 200 and 201 may not switch at exactly the point where capacitor 204 changes sign if the circuit is not operating at precisely unity power factor but the extra switches 310A and 310B switch on the zero crossing of capacitor 204.

Figure 4:
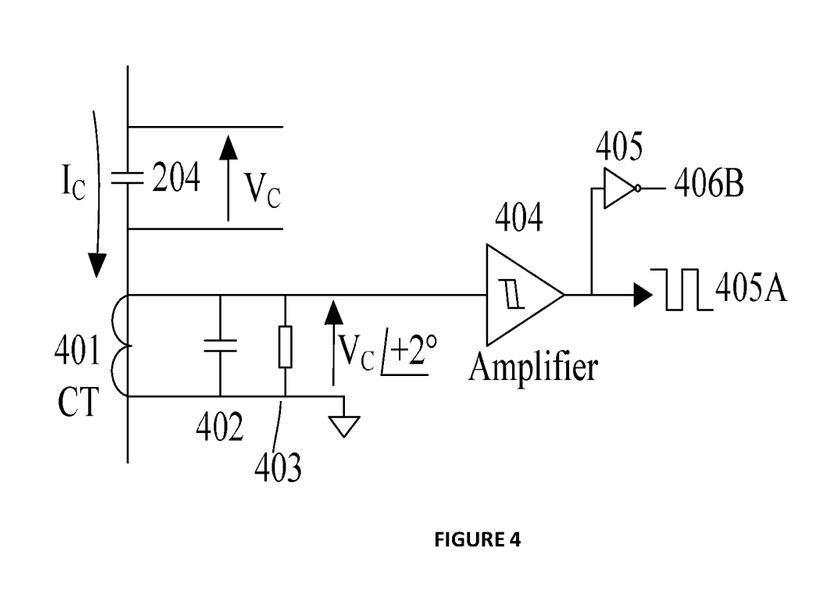
FIG. 4: is a diagram of a detection circuit according to one aspect of the invention.

Measuring the voltage crossings on capacitor 204 is not trivial as the voltage changes sign at relatively high speed. However an elegant way to measure it is shown in FIG. 4. Here a current transformer is used to detect the current in capacitor 204. The output from the current transformer is a current source that charges capacitor 402—thus the voltage across capacitor 402 is the integral of the current through capacitor 204—which from first principles is the voltage across capacitor 204. The zero crossings of capacitor 402 are therefore the correct times to operate the switches 310A and B which can be switched on for the exact half cycles that they are needed for by squaring the 402 capacitor voltage and adding an inverter. Resistor 403 adds a very slight phase lead to the zero crossing detection circuit. This phase lead allows for the propagation delays in the gates driving the switches. A phase lead of 5 degrees at 140 kHz for example would correct for a propagation delay of 97 ns which is likely to be the approximate delay that would be experienced. The circuit may be trimmed by adjusting resistor 403 to get the delay as precise as possible.

A Power Supply with Multiple Output Frequencies

Figure 5:
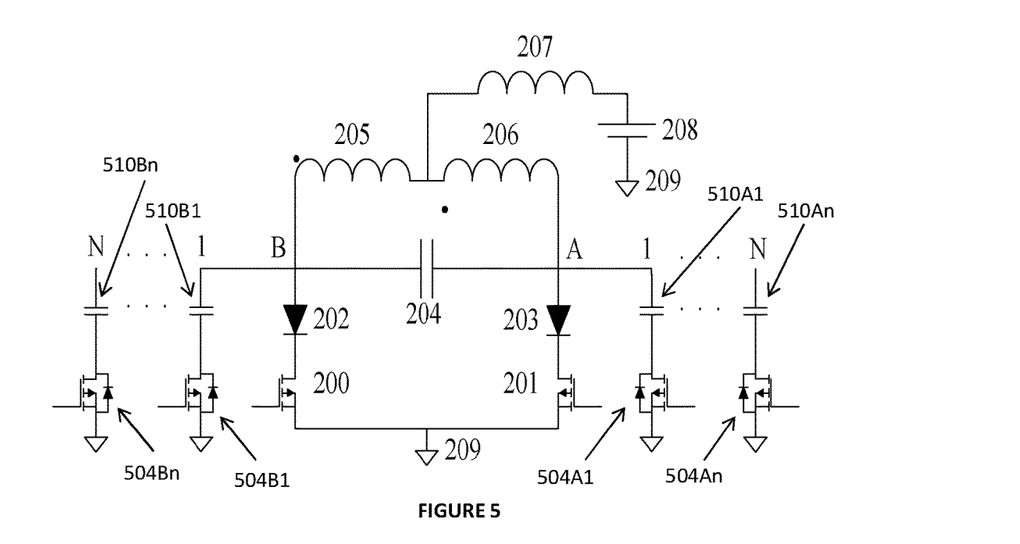
FIG. 5: is a diagram of another embodiment an inverter according to the present invention.

By adding extra capacitors and switches the power supply of FIG. 3 can be converted to FIG. 5 that can operate over a relatively wide range of precise frequencies.

The number of switches required to get a range of frequencies may be greatly reduced if the extra capacitors are weighted in a sequence. For example with 4 switches (on each side) weighted 1:2:4:8 any capacitor size from 1-15 may be selected. The number of capacitors and switches may be reduced further by 'dithering' the switches on alternative cycles. Thus capacitors can be selectively switched in or out in groups or individually in cycles that may be selected over time (i.e. over a plurality of cycles of the resonant circuit) so that over time, or on average, a desired output or behaviour of the resonant circuit is achieved. A capacitor with a weight of 3 switched alternatively with one of 4 gives an equivalent weight of 3½—or three capacitors with weights of 1:2:4 can be dithered to give: 0, ½, 1, 1½, 2, 2½, 3, 3½, 4, 4½, 5, 5½, 6, 6½, 7 giving 15 selectable values with 3 capacitors. As noted all the ½ steps are achieved by alternating the value with the next step up—5½ is 5 alternated with 6 which is 4+1 alternated with 4+2, or 3½ is 1+2 alternated with 4. All the switchings are done at zero voltage so the disruption to the circuit is minimal.

The circuit of FIG. 5 can be used to produce multiple possible output frequencies and may be used to set different operating frequencies for inductive power transfer (IPT) applications for example. Thus a single device may be used to provide different operating frequencies depending on circumstances and/or the secondary devices into which they are transferring power. Typically an operating frequency will be set and then maintained constant for a particular application or secondary device. However should the application or secondary device change then the primary resonant inverter may be re-set to a different operating frequency in the manner described above.

Figure 9:
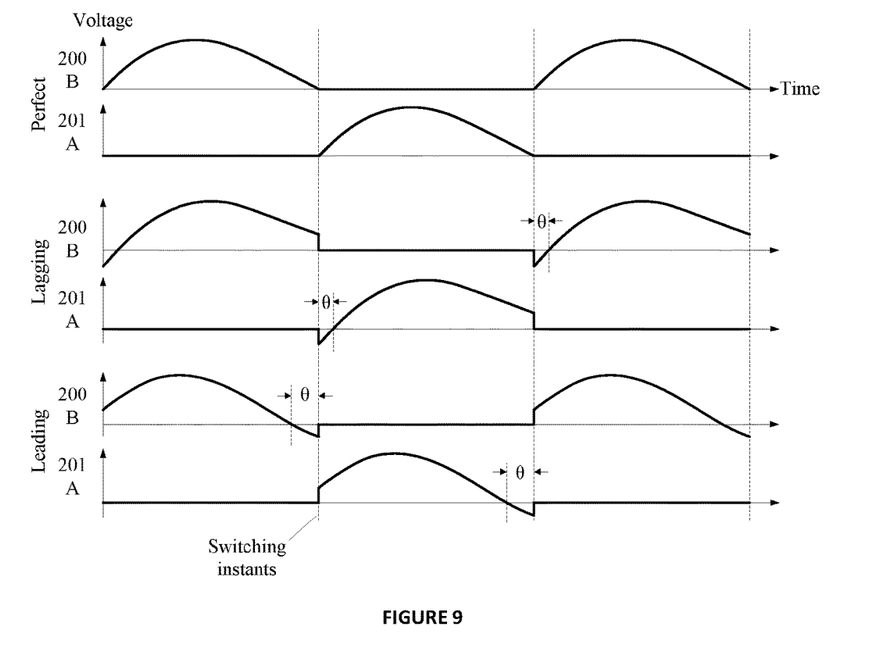
FIG. 9: shows inverter waveforms.

In an alternative embodiment, the resonant inverter circuits of FIGS. 3 and 5 may be operated to produce one frequency but correct any VAR errors by switching in or out one or more control capacities 304A, 304B, 504A1-504AN, 504B1-504BN. Referring to FIG. 9, the voltage wave forms at points A and B are shown for unity power factor, a lagging power factor, and a leading power factor respectively. The switching instants of switches 200 and 201 are shown, and with a unity power factor these coincide with the zero voltages of the wave forms at point A and point B as shown. Operating the resonant inverter in tune or close to unity power factor enables maximum power transfer and also minimises the voltage across the switching transistors 200 or 201 when these are ON, thereby reducing any current flowing through these transistors and hence minimising potential damage.

However in practice the tuning or power factor of the inverter can change dynamically due to changes in secondary loading or coupling, for example due to changing distance between the primary and secondary coils. If the resonant circuit is not perfectly tuned, the resonant current leads or lags the switching instants as shown, which can lead to large peak voltages across the switching transistors 200 or 201 especially as the power factor moves closer to zero. Combined with high frequency operation, the change in voltage across the switching transistors 200 or 201 is significant especially as the power factor moves away from unity. Combined with high frequency operation, the change in frequency across the switching transistors must be limited and if it is not otherwise controlled can destroy or damage the switching transistors. The same considerations also apply for the secondary switches 310A, 310B, 510A1-510AN, 510B1-510BN which are switched together with their corresponding first switching device 200 or 201 as described above. For example the peak voltage at point A is $\pi$ multiplied by the supply voltage 208—thus where the supply voltage is 300V, the peak voltage is 942V. However if the inverter is not tuned, the peak voltage at point A or point B is now the supply voltage multiplied by $\pi/\cos(\theta)$. Here $\theta$ is the phase angle between the resonant current and switching waveform. Thus the peak voltage can become very large as e approaches 90°—for example for a power factor of 0.05 (5%), the peak voltage for a supply voltage of 300V is in excess of 10 kV and cannot be sustained.

The control capacitances can be switched in or out of the inverter circuit of FIG. 5 in order to tune the resonant circuit, moving the power factor closer to unity and reducing peak voltages and hence voltage transients across the switching transistors. An improved power factor also maximises the power transferred to a secondary device even given dynamically changing coupling and/or load conditions. Thus the resonant inverter can be controlled in order to selectively switch one or more control capacitances into or out of the resonant circuit depending on the power factor of the resonant circuit. As described previously with respect to the multiple frequency embodiments, the control capacitances are preferably switched into or out of the inverter circuit at the zero voltage crossings at points A and B respectively. Determination of the capacitor voltage zero crossings can be implemented using the circuit of FIG. 4 as previously described for example.

For this self-tuning of the circuit it is necessary to dynamically measure the power factor so that the circuit can be operated with unity power factor even if the circuit parameters change. As noted the ideal voltage waveform in this circuit has a phase that is the same as the clock signals driving the switches 200 and 201. The circulating current through capacitor 204 is already available as the output of the circuit of FIG. 4, converted into a square wave, and if the circuit is perfectly tuned then we require these two square wave signals to be perfectly in phase. In practice it is easier to measure phase differences when the signals have an ideal phase angle between them of 90 degrees rather than zero. Here a new voltage reference can easily be produced—the clock signals for switches 200 and 201 must be supplied by a microprocessor or FPGA using a crystal source and it is trivial to get an additional output frequency shifted by 90 degrees with respect to the signals that drive the switches. Furthermore, if required, this signal can have its phase slightly advanced or retarded to correct for propagation delays in the circuitry.

Figure 6:
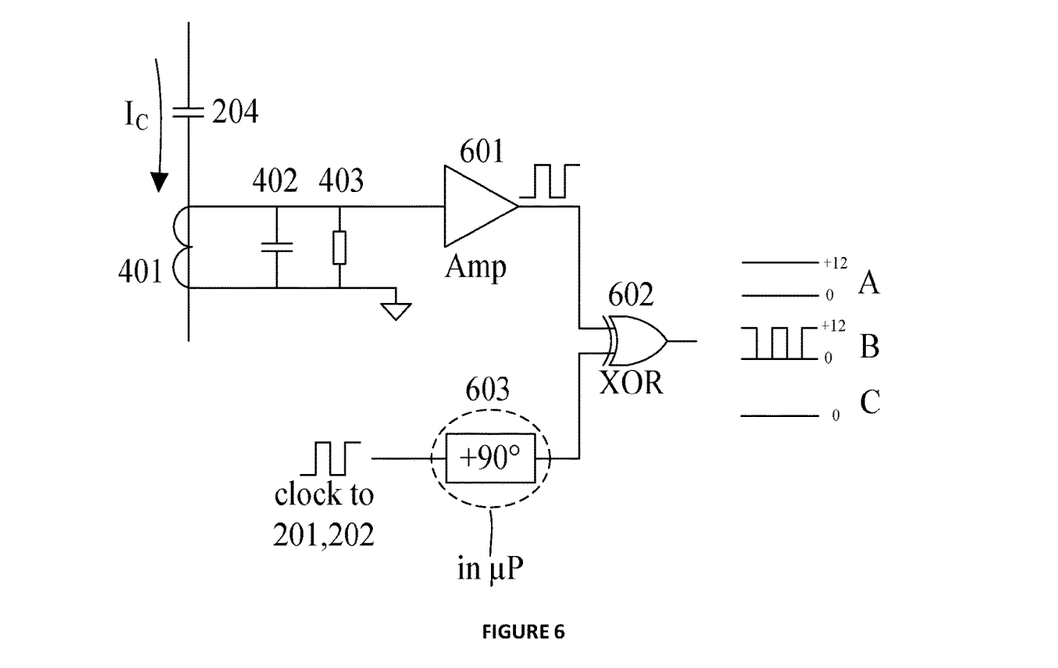
FIG. 6: is a diagram of a power factor measurement circuit according to one aspect of the invention.

A circuit for measuring the power factor is shown in FIG. 6 using a current transformer 401. Not all of the current is measured—only the current in capacitor 204—but as this is typically 70-80% of the total current this is sufficient for the control purpose here as only the phase of the current is used and not the magnitude. As shown in FIG. 6 the output from current transformer 401 is integrated by capacitor 402 and squared by amplifier 601. The microprocessor controlling the whole power supply now produces an alternative square wave output at a 90 degree phase angle relative to the switch gate waveforms—conceptually shown here by the circuit element 603. The outputs of 602 and 603 are multiplied by an exclusive or gate: If the inputs to the X-OR gate are in phase (condition A) the output will be typically 12 V corresponding to the power supply for the X-OR gate, if they are at 90 degrees (the ideal situation) the output will switch at twice the resonant frequency (condition B), and if the inputs are at 180 degrees then the output will be continuously low (C). It is a simple matter to measure the outputs and determine the phase angle. In practice a digital technique is easy to use here. Over a period where a counter could count a maximum of say 1000 counts, if the counter input is gated by the output of the X-OR in case A it will count 1000 counts, in case B it will count 500, and in case C it will count zero. Furthermore the output may be scaled so that it counts to how many capacitor switches need to be ON to tune the circuit by counting 0-15 corresponding to the 1:2:4:8 capacitor selection shown in FIG. 5.

A simple set up for this is to choose capacitor 204 in FIG. 5 to supply 80% of the capacitance required. Then if the extra capacitance is made up with 4 switches and capacitors 1:2:4:8 giving 1-15 corresponding here to 2½% steps, then 8 steps adds 20% giving ideal tuning at 100% capacitance, 0 steps is tuning at 80% capacitance (the inductance values are high), and 15 steps is tuning at 115% (the inductance values are low), and the counting system will provide all the steps in between. More resolution is achievable with more steps or dithering the switchings. This tuning can be done very quickly—less than 1 ms. The system can be made into a PI controller by measuring the error and algebraically adding the error to the present number of steps to give the fastest possible response to achieve full tuning, yet be responsive to changes. It will be seen that the inverter topologies described can be tuned so well that the diode between each switch 200, 201 and tuning capacitor 204 may not be required. Furthermore, the second switches 310A, 310B etc. will naturally turn off.

Starting and Shut-Down

Figure 7:
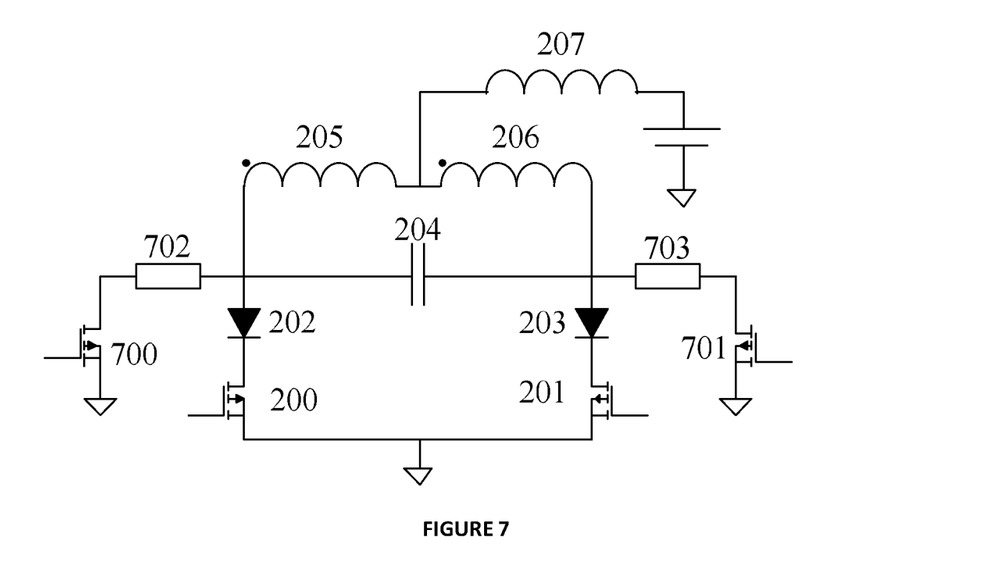
FIG. 7: is a diagram of another embodiment an inverter according to the present invention.

The circuit described in FIGS. 3 and 5 is relatively difficult to stop and to start—especially with a fixed clock frequency. These problems may be alleviated by adding another pair of switches with resistors in series with them as shown in FIG. 7. To start the circuit switches 200, 201 are left OFF and switches 700, 701 are switched at the correct frequency with the correct DC supply voltage. Resistors 702, 703 are chosen to gives the circuit near critical damping—perhaps 0.8 times critical to give 1% overshoot. The circuit will reach full voltage very quickly whereupon the regular switches can be enabled and 700, 701 can be turned off.

Alternatively these second switching means may be kept running as the voltages across resistors 702, 703 are zero so now no power is wasted. If this option is chosen then shutting the circuit down simply requires removing gate signals to 200, 201 when they have no voltage across them, thereby forcing the circuit currents to flow through resistors 702, 703 where energy is taken from the circuit and resonance collapses. Capacitor 204 is still in circuit and the resonant current can still flow through this so that only the real (power) circuit flows through the resistors. The completion of the shutdown is to leave all of the transistors off, ready for another start as required.

In another arrangement, if the circuit is at full power (and the control resistors are switched off) stopping the circuit or performing a shut-down in the case of a resonant voltage that is too high for the safety the switches may be implemented as follows. When one first switch is on—say 200—switch ON 701 (the opposing third resistor means switch), then switch ON 700—ie the resistor switches in parallel with 200. Keeping 201 OFF, then switch OFF 200 and either keep the resistor switches ON to shut down the circuit, or alternatively switch 700 and 701 using the first switching means clock or control signals so that the circuit is now being driven through resistors and cannot resonate so that the voltages in it will stabilize at the supply voltage. The voltage across 200 will rise but stay below 1100 V. The circuit will stabilize with all capacitors at the DC supply voltage.

The operation of all of these circuits with respect to voltage control is that the resonant tank voltage will increase until the DC voltage across inductor 207 is stable with only DC current in the inductor. Under these conditions the AC rms voltage across capacitor 204 is the DC voltage 208 times $$\frac{\pi}{\sqrt{2}}$$

so for a 300 V DC supply the AC capacitor voltage will be 666 V AC rms. If the inductor 207 is not used the same numerical value still obtains. It is the high output voltage that is a feature of this circuit and here that is shown clearly in that the output voltage of 666 V AC is generated from a 300 V DC supply.

Soft Starting and Stopping, and Over-Voltage Control

Figure 8:
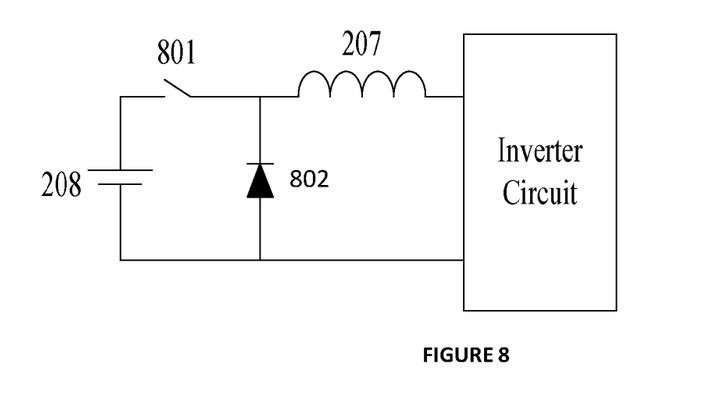
FIG. 8: is a diagram of another embodiment an inverter according to the present invention.

An alternative method for stopping and starting is shown in FIG. 8. Here the supply to the inverter circuit itself is through inductor 207 (this inductor is still optional and if it is not used then the feed is through inductors 205 and 206 in parallel) and the switch 801 operates with a duty cycle D such that the average voltage across the diode 802 is the input voltage 208 times the duty cycle D of the switch 801. This circuit is a Buck controller and is well known but here a current output is taken so that the component count is minimised. The circuit can be started with D at essentially zero and then ramped up to full voltage by sweeping D over the range 0 to 1. In practice 208 is typically 300V and the equivalent output voltage can be swept over the range 0 to 300 V by linearly changing D. The same sweep in reverse may now be used to switch the circuit off by reducing D to zero. In practice ramping up and down can be relatively quick and transitions in the order of 100 microseconds or less are easily achievable.

The duty cycle D of the buck control circuit can also be controlled in order to adjust the voltage across the tuning capacitor in other circumstances, and in particular to reduce the voltage in response to an over voltage condition where the resonant circuit is out of tune or has a non-unity power factor. As discussed above, when the resonant circuit is out of tune, the resonant current is leading or lagging the switching waveform which can result in large peak voltages across the switching transistors and at high frequency very large voltage transients which can cause damage.

The operating voltages of the basic circuit shown in FIG. 2 are the drain voltages for transistors 200 and 201 corresponding to the points labelled A and B on FIG. 2. These voltages are shown for a short sequence on FIG. 9 where the upper waveform is for perfect tuning and the lower waveforms are for leading and lagging power factor respectively. The waveforms A and B are the actual voltages that would be observable with a CRO and are synchronous with the switching instants of the transistors. If the circuit is perfectly tuned the switching instants and the zero crossings of the resonant tank are identical but if the circuit is not perfectly tuned they are not identical but the tank circuit leads or lags the switching instants as shown. Under perfect conditions the average voltage at point A is the peak voltage times $$\frac{1}{\pi}$$

and this must equal the DC voltage input 208 so that the peak voltage is π times VDC and if VDC is 300 V the peak voltage is 942 Volts. But if the circuit is not perfectly tuned but there is an angle θ between the capacitor tuning current and the switching waveforms then the average voltage at point A or B is the peak voltage times $\cos(\theta)/\pi$.

Thus with the same averaging as before the peak voltage is now VDC times $\pi/\cos(\theta)$ and can become very large if $\theta$ approaches 90 degrees. The method of tuning using capacitors as shown in FIG. 5 can be used to tune the circuit and eliminate this problem. But the buck converter may also be used with an un-tuned circuit—VDC may be modified (reduced) by controlling the duty cycle D of the buck circuit switch 801. The peak voltage can now be contained within the ratings of the transistors. This is a very low cost arrangement using only three switches. In most cases the amount of mistuning will be less than 10-20 degrees corresponding to a power factor of 0.94 or better and the degree of modification of D is less than 10% but it is achieved at low cost with no extra tuning components. Note that the same control function is effective for both leading and lagging conditions. As e approaches 90 degrees the circuit will be protected but the power output will be reduced—if the power must be maintained then the circuit of FIG. 5—or equivalent—can additionally or alternatively be used.

The circuit of FIG. 8 combined with the circuit of FIG. 2 gives a resonant power supply that is easily and cheaply controlled. All the protection features are achieved using the Buck controller and the circuit can drive leading and lagging power factors without difficulty and with high efficiency at high frequencies. The transistors may be kept switching all the time so that whenever power is applied the circuit will process it and output inverter waveforms and in particular has the ability to operate at high frequency without restrictions on dI/dt and dv/dt.

The duty cycle D of the buck controller can be controlled by adjusting the switching of device 801 in response to the power factor determined from the resonant circuit, for example using the circuit of FIG. 5. Alternatively the voltage at point A or point B may be measured using for example the circuit of FIG. 4 without squaring amplifier 404. As the voltage exceeds a pre-determined threshold, the duty cycle D is reduced in order to maintain the resonant voltages within predetermined bounds.

The various embodiments described above may be employed together a single resonant inverter circuit, or may be deployed separately depending on the requirements of the power supply requirement.

It will be appreciated that the invention described with reference to FIG. 7 allows the Q factor of the resonant circuit to be controlled, and may be applied to other inverter circuits than those disclosed in this document.

The invention claimed is:

1. A resonant inverter including:
   an input for supply of current from a DC power source, a resonant circuit including two electrically or magnetically coupled inductive elements and a tuning capacitance, the inductive elements being arranged to split current from the power source;
   a first switching means comprising two switching devices operable in substantially opposite phase to alternately switch current from the power source into the inductive elements;
   a second switching means to selectively switch one or more control capacitances into or out of the resonant circuit dependent on a power factor of the resonant circuit; and
   a power factor detection circuit arranged to determine the power factor by determining a phase difference between the current of the resonant circuit and a switching signal for driving the switching devices.

2. The resonant inverter according to claim 1, wherein the second switching means comprises a switching device and a said control capacitance connected in parallel with each of the switching devices of the first switching means.

3. The resonant inverter according to claim 1, wherein the second switch means is arranged to switch the control capacitance into or out of the resonant circuit at zero voltage crossings of the tuning capacitance.

4. The resonant circuit according to claim 1, wherein the power factor detection circuit comprises a current transformer coupled to the resonant circuit and an integrating capacitor, a squarer coupled across the integrating capacitor, and a comparator for comparing the output of the squarer with the switching signal.

5. The resonant inverter according to claim 1, wherein individual or groups of control capacitances of a plurality of control capacitances are arranged to be selectively switched into or out of the resonant circuit in selected cycles of the resonant circuit to control the operation of the inverter.

6. The resonant inverter according to claim 1, further comprising a buck control circuit coupled between the input and the inductive elements, the buck control circuit having a diode and buck control switch having a duty cycle which is controlled in order to reduce the voltage across the tuning capacitor in response to an over voltage condition.

7. The resonant inverter according to claim 6, wherein the duty cycle is controlled in order to stop or start the resonant circuit.

8. The resonant inverter according to claim 6, wherein the duty cycle is controlled in order to reduce the voltage across the tuning capacitor in response to a power factor of the resonating current.

9. The resonant inverter according to claim 1, further comprising:
   a third switching means arranged to selectively switch a control resistor into or out of the resonant circuit in order to start or stop the resonant circuit.

10. The resonant inverter according to claim 1, wherein individual or groups of control capacitances of a plurality of control capacitances are arranged to be selectively switched into or out of the resonant circuit in selected cycles of the resonant circuit to control operating frequencies of the inverter.

11. The resonant inverter according to claim 1, wherein the second switch means comprises a plurality of capacitors weighted in a sequence.

12. A method of operating a resonant inverter having an input for supply of current from a DC power source, a resonant circuit including two electrically or magnetically coupled inductive elements and a tuning capacitance, the inductive elements being arranged to split current from the power source, first switching means comprising two switching devices and second switching means; the method comprising:
   switching the two switching devices in substantially opposite phase to alternately switch current from the power source into the inductive elements;
   switching the second switching means to selectively switch one or more control capacitances into or out of the resonant circuit dependent on a power factor of the resonant circuit; and
   determining the power factor by determining a phase difference between the current of the resonant circuit and a switching signal for driving the switching devices.

13. The method according to claim 12, wherein individual or groups of control capacitances of a plurality of control capacitances are selectively switched into or out of the resonant circuit in selected cycles of the resonant circuit to control the operation of the inverter.

14. The method according to claim 12, further comprising:
   a third switching means arranged to selectively switch a control resistor into or out of the resonant circuit in order to start or stop the resonant circuit.

* * * * *